United States Patent
Wu et al.

(10) Patent No.: US 10,451,416 B1
(45) Date of Patent: Oct. 22, 2019

(54) OPTIMIZING SENSOR PLACEMENT FOR STRUCTURAL HEALTH MONITORING BASED ON INFORMATION ENTROPY OR TOTAL MODAL ENERGY

(71) Applicant: Bentley Systems, Incorporated, Exton, PA (US)

(72) Inventors: Zheng Yi Wu, Watertown, CT (US); Dapeng Zhu, Bellevue, WA (US)

(73) Assignee: Bentley Systems, Incorporated, Exton, PA (US)

( * ) Notice: Subject to any disclaimer, the term of this patent is extended or adjusted under 35 U.S.C. 154(b) by 188 days.

(21) Appl. No.: 15/187,268

(22) Filed: Jun. 20, 2016

(51) Int. Cl.
G01B 21/16 (2006.01)
G01M 7/02 (2006.01)

(52) U.S. Cl.
CPC ............ G01B 21/16 (2013.01); G01M 7/025 (2013.01)

(58) Field of Classification Search
CPC ....................................................... G01B 21/16
USPC ......................................................... 702/150
See application file for complete search history.

(56) References Cited

U.S. PATENT DOCUMENTS

| | | | |
|---|---|---|---|
| 6,006,604 A | 12/1999 | Rabelo et al. | |
| 7,574,338 B1 | 8/2009 | Kaul | |
| 8,209,134 B2 * | 6/2012 | Parker | G01B 11/03 250/203.2 |
| 8,265,911 B1 | 9/2012 | Wu et al. | |
| 8,301,400 B2 | 10/2012 | Beard et al. | |
| 8,458,715 B1 | 6/2013 | Khosla et al. | |
| 9,014,415 B2 | 4/2015 | Chen et al. | |
| 9,354,043 B2 | 5/2016 | Parker et al. | |
| 2002/0046144 A1 | 4/2002 | Graff | |
| 2005/0072234 A1 | 4/2005 | Zhu et al. | |
| 2007/0255522 A1 * | 11/2007 | Gordon | G01N 29/07 702/150 |
| 2008/0178663 A1 | 7/2008 | Yang et al. | |
| 2008/0255777 A1 * | 10/2008 | Beard | G01N 29/041 702/35 |
| 2008/0255804 A1 * | 10/2008 | Liu | G01N 29/041 702/181 |
| 2009/0326834 A1 | 12/2009 | Sundaresan et al. | |
| 2011/0046929 A1 | 2/2011 | Bryant | |
| 2012/0123981 A1 | 5/2012 | Graves et al. | |
| 2013/0018525 A1 | 1/2013 | Jang et al. | |
| 2013/0220902 A1 | 8/2013 | Lee et al. | |
| 2013/0262068 A1 | 10/2013 | Israeli et al. | |
| 2013/0327148 A1 | 12/2013 | Yan et al. | |

(Continued)

OTHER PUBLICATIONS

Basseville, Michele et al. "Optimal Sensor Location for Detecting Changes in Dynamical Behavior", IEEE Transactions on Automatic Control, vol. AC-32, No. 12, Dec. 1987, 9 pages.

(Continued)

Primary Examiner — Ricky Ngon
(74) Attorney, Agent, or Firm — Cesari and McKenna, LLP; James A. Blanchette

(57) ABSTRACT

In an example embodiment, an analysis application is used to optimize sensor placement by minimizing information entropy or maximizing total modal energy. These objectives are achieved by implementing a two-part optimization procedure, involving generating an evaluation database that stores an information matrix, and using the evaluation in conjunction with a genetic algorithm to produce an optimized sensor location set.

22 Claims, 20 Drawing Sheets

(56) References Cited

U.S. PATENT DOCUMENTS

| | | | |
|---|---|---|---|
| 2014/0058709 A1* | 2/2014 | Machado Viana | G01M 5/0033 703/2 |
| 2014/0163916 A1 | 6/2014 | Ba et al. | |
| 2015/0088372 A1 | 3/2015 | Nower et al. | |
| 2016/0232794 A1* | 8/2016 | Hafeez | G08G 5/0034 |

OTHER PUBLICATIONS

Cobb, Richard G, & Liebst, Brad S., "Sensor Placement and Structural Damage Identification From Minimal Sensor Information," *AIAA Journal*, Feb. 1997, 35(2), pp. 369-374.

"Darwin Optimization User Manual", Bentley Systems, Incorporated, Sep. 2012, 40 pages.

Gawronski, W., "Actuator and Sensor Placement for Structural Testing and Control," Academic Press Limited, *Journal of Sound and Vibration*, Jul. 1997, 208(1), pp. 101-109.

Glaser, S. D., Li, H., Wang, M. L., Ou, L, & Lynch, J. P., "Sensor Technology Innovation for the Advancement of Structural Health Monitoring: A Strategic Program of US-China Research for the Next Decade," *Smart Structures and Systems*, Jan. 2007, 3(2), pp. 221-244.

Hamdan, A.M.A., & Nayfeh, A.H., "Measures of Modal Controllability and Observability for First-and Second-Order Linear Systems," *Journal of Guidance, Control, and Dynamics*, May-Jun. 1989, 12(3), pp. 421-428.

Kammer, Daniel C., "Sensor Placement for On-Orbit Modal identification and Correlation of Large Space Structures," *Journal of Guidance, Control, and Dynamics*, Mar.-Apr. 1991, 14(2), pp. 251-259.

Kammer, Daniel C., "Sensor Set Expansion for Modal Vibration Testing," *Mechanical Systems and Signal Processing*, Jul. 2005, 19(4), pp. 700-713.

Kirkegaard, Poul Henning, & Brincker, Rune, "On the Optimal Location of Sensors for Parametric Identification of Linear Structural Systems," Academic Press Limited, *Mechanical Systems and Signal Processing*, Nov. 1994, 8(6), pp. 639-647.

Mackiewicz, Andrzej, Holnlcki-Szulc, Jan, & Lopez-Almansa, Francisco, "Optimal Sensor Location in Active Control of Flexible Structures," *AIAA Journal*, Mar. 1996, 34(4), pp. 857-859.

Mahfoud, Samir W, & Goldberg, David E., "Parallel Recombinative Simulated Annealing: A Genetic Algorithm," *Parallel Computing*, Jan. 1995, 21(1), pp. 1-28.

Papadimitriou, Costas et al., "Entropy-based Optimal Sensor Location for Structural Model Updating", Journal of Vibration and Control, vol. 6, Dec. 17, 1999, 20 pages.

Papadimitriou, C., "Optimal Sensor Placement Methodology for Parametric Identification of Structural Systems", Journal of Sound and Vibration 278 (2004), 923-947, Oct. 21, 2003.

Papadimitriou, Costas, & Lombaert, Geert, "The Effect of Prediction Error Correlation on Optimal Sensor Placement in Structural Dynamics," Elsevier Ltd, *Mechanical Systems and Signal Processing*, 2012, vol. 28, pp. 105-127.

Shi, Z. Y., et al., "Optimum Sensor Placement for Structural Damage Detection," Journal of Engineering Mechanics, Nov. 2000, 126(11), pp. 1173-1179.

Shih, Y-T, Lee, AC, & Chen, J-H, "Sensor and Actuator Placement for Modal Identification," Academic Press, Mechanical Systems and Signal Processing, Mar. 1998, 12(5), pp. 641-659.

Spanache, Stefan et al., "Sensor Placement Optimisation Using Genetic Algorithms", In 15th International Workshop on Principles of Diagnosis (DX'04), pp. 179-184, Jun. 23, 2004.

"STAAD.Pro Technical Reference Manual", Bentley Systems Incorporated, Nov. 19, 2012, 775 pages.

Udwadia, Firdaus E., "Methodology for Optimum Sensor Locations for Parameter Identification in Dynamic Systems," ASCE, Journal of Engineering Mechanics, Feb. 1994, 120(2), pp. 368-390.

U.S. Appl. No. 14/563,668, filed Dec. 8, 2014 by Zheng Yi Wu et al. for a Optimizing Sensor Placement for Structural Health Monitoring, 1-34.

Worden, K. et al., "Optimal Sensor Placement for Fault Detection", Engineering Structures 23 (2001), Nov. 16, 2000, pp. 885-901.

Wu, Zheng Yi, "Optimizing Pressure Logger Placement for Leakage Detection and Model Calibration", 14th Water Distribution Systems Analysis Conference, Sep. 24, 2012, 13 pages.

Wu, Z. Y., et al., "Optimizing Sensor Placement and Dynamic Measurements of Verrazano Narrows Bridge Span," The 6th International Conference on Structural Health Monitoring of Intelligent Infrastructure, Hong Kong, Dec. 9-11, 2013, pp. 1-10.

Yao, Leehter et al., "Sensor Placement for On-Orbit Modal Identification via a Genetic Algorithm", AIAA Journal, vol. 31, No. 10, Oct. 1993, 7 pages.

Yi, Ting-Hua et al., "Methodology Developments in Sensor Placement for Health Monitoring of Civil Infrastructures", Hindawi Publishing Corporation, International Journal of Distributed Sensor Networks, vol. 2012, Article ID 612726, Aug. 7, 2012, 12 pages.

Yi, Ting-Hua et al., "Optimal Sensor Placement for Health Monitoring if High-Rise Structure Based on Genetic Algorithm", Hindawi Publishing Corporation, Mathematical Problems in Engineering, vol. 11, Article ID 395101, Mar. 2, 2011, 13 pages.

Berry, J., Fleischer, L., Hart, W. E., Phillips, C. A. and Watson, J.-P., "Sensor Placement in Municipal Water Networks," ASCE Journal of Water Planning and Resources Management, 131:237-243, Jan. 2005, pp. 1-10.

Grayman, W., Speight, V., and Uber, J., "Using Monte-Carlo Simulation to Evaluate Alternative Water Quality Sampling Plans," Water Distribution Systems Analysis Symposium, Aug. 2006, pp. 1-11.

Guratzsch, Robert F., et al., "Structural Health Monitoring Sensor Placement Optimization Under Uncertainty," AIAA Journal, vol. 48, No. 7, Jul. 2010, pp. 1281-1289.

Isovitsch, S. L., VanBriesen, J. M., "Sensor Placement and Optimization Criteria Dependencie in a Water Distribution System," J. Water Resour. Plann. Manage. vol. 134(2), Mar. 2008, pp. 186-196.

Janke, R., "Threat Ensemble Vulnerability Assessment Sensor Placement Optimization Tool (TEVA-SPOT) Graphical User Interface User's Manual," U.S. EPA National Homeland Security Research Center (NHSRC), Sep. 2012, pp. 1-109.

Krause, A., Leskovec, J., Isovitsch, S., Xu, J., Guestrin, c., VanBriesen, J., Small, M., Fischbeck, P., "Optimizing Sensor Placements in Water Distribution Systems Using Submodular Function Maximization," 8th Annual Water Distribution Systems Analysis Symposium, Cincinnati, Ohio, USA, Aug. 27-30, 2006, pp. 1-17.

Preis, Ami, et al., "Multi-objective Sensor Network Placement Model for Integrated Monitoring of Hydraulic and Water Quality Parameters," World City Water Forum, WCWF, Aug. 18, 2009, pp. 1-10.

Shen, R. and McBean, E., "Pareto Optimality for Sensor Placements in a Water Distribution System," J. Water Resour. Plann. Manage. 137(3), May 2011, pp. 243-248.

Speight, V., Kalsbeek, W., and DiGiano, F., "Randomized Stratified Sampling Methodology for Water Quality in Distribution Systems," ASCE J. Water Resour. Plann. Manage. 130(4), Jul. 2004, pp. 330-338.

U.S. Appl. No. 14/726,189, filed May 29, 2015 by Zheng Yi Wu, et al. for Optimizing Water Quality Sensor Placement for Water Distribution Systems, pp. 1-29.

Wu, Zhen Yi, et al. "Multi Objective Optimization of Sensor Placement in Water Distribution Systems," 2006 Annual Symposium on Water Distribution Systems Analysis, Cincinnati, Ohio, U.S.A., Aug. 27-30, 2006, pp. 1-11.

Wu, Zhen Yi, "Optimal Calibration Method for Water Distribution Water Quality Model," Taylor & Francis Group, LLC, Journal of Environmental Science and Health Part A, 41:1-16, Apr. 18, 2006, pp. 1-17.

\* cited by examiner

FIG. 3E

Results

| Summary | Solution | | | |
|---|---|---|---|---|
| Solution ID | Uncovered Percentage | Equivalent Covered Events | Total Events | |
| 1 | 57.2 | 428 | 1000 | |
| 2 | 59.3 | 407 | 1000 | |
| 3 | 60.4 | 396 | 1000 | |

Back  Exit 340, 342

*342*

Bentley DarwinSHM Pretest

| Summary | Solution |
| --- | --- | solution 1

Results

| Sensor ID | Optimized Node Label | Measurement Direction | Existed Node Label | Measurement Direction |
| --- | --- | --- | --- | --- |
| 1 | 1245 | Y | 1051 | X |
| 2 | 703 | X | 121 | Z |
| 3 | 1186 | X | 1168 | X |
| 4 | 690 | Y | 156 | Z |
| 5 | 843 | Y | 1208 | X |
| 6 | 835 | X | 305 | Z |
| 7 | 1128 | X | 1210 | X |
| 8 | 552 | Z | 393 | Z |
| 9 | 955 | Y | 1212 | X |
| 10 | 928 | Z | 420 | Z |
| 11 | | | 1213 | X |

{ *354* }

Back    Exit

FIG. 3F

OPTIMIZING SENSOR PLACEMENT FOR STRUCTURAL HEALTH MONITORING BASED ON INFORMATION ENTROPY OR TOTAL MODAL ENERGY

BACKGROUND

Technical Field

The present disclosure relates generally to structural health monitoring, and more specifically to techniques for optimizing sensor placement for structural health monitoring based on information entropy or total modal energy.

Background Information

Structural deterioration is inevitable for structures (e.g., bridges, dams, buildings, etc.) that are subjected to adverse operational and environmental conditions over long service lives. For example, in the year 2006, over 26% of the 600,905 bridges in the U.S. were rated as either structurally deficient or functionally obsolete. As a result of economic considerations, most of these aging structures are still in service. If existing deficiencies are not improved, for example, damage and cracks detected and repaired at an early stage, minor deficiencies may grow and lead to expensive repairs or, if unaddressed for too long, to catastrophic failures.

To try to address these issues, many structures are periodically inspected for structural deterioration. For example, in the case of bridges in the United States, biennial bridge inspection is mandated by the Federal Highway Administration (FHWA). Typically, such inspection is a manual process, performed primarily visually by skilled engineers. The visual inspections are often quite time-consuming and labor-intensive, and even if diligently performed, generally cannot detect small-size cracks or cracks hidden under paint. Visual inspections may miss many types of hidden deterioration, and seldom reveals the underlying causes of structural damage. Accordingly, they provide an inadequate and unreliable solution to the problem of detecting structural deterioration.

A number of automated structural health monitoring (SHM) systems have been developed, that have the potential to improve upon visual inspection. A typical SHM system includes a collection of sensors (e.g., accelerometers, strain gauges, corrosion sensors, etc.) placed on a structure, which are connected via cabling to one or more data acquisition units. The SHM system may constantly monitor the structure, and alert engineers if sensor readings indicate possible structural damage. Use of a SHM system may potentially allow engineers to move from current time-based maintenance programs to condition-based maintenance programs, which, in theory, could be more cost-effective.

Unfortunately, initial deployment of SHM systems may be quite expensive, reducing any potential overall cost savings. Such expense may be directly related to the number of sensors deployed. In addition to the cost of each sensor itself, additional costs are generally incurred for cabling back to data acquisition units, and for installation labor. Some deployed systems have used large numbers of sensors, in attempts to observe all potentially relevant behavior. Although SHM systems may provide valuable measurements of structural health, the expense involved in their initial deployment has prevented them from achieving widespread use.

It would be desirable to utilize only a limited number of sensors with a SHM system. In order to utilize a limited number of sensors, each sensor should be optimally placed on the structure to maximize the value of the information they are able to collect. However, determining such optimal placements may prove challenging for engineers in the field. Accordingly, there is a need for more accessible techniques for optimizing sensor placement.

SUMMARY

In an example embodiment, an analysis application is used to optimize sensor placement by minimizing information entropy or maximizing total modal energy. These objectives are achieved by implementing a two-part optimization procedure, involving generating an evaluation database that stores an information matrix, and using the evaluation database in conjunction with a genetic algorithm to produce an optimized sensor location set.

More specifically, in an example embodiment, an information matrix generation module of an analysis application generates an evaluation database that stores an information matrix usable to determine information entropy or mode shape for sensor placement. For a user selected number of sensors, an optimized sensor location set is determined. To determine the optimized sensor location set, an optimization module of the analysis application utilizes a genetic algorithm to determine successive candidate sensor location sets. A sensor placement evaluation module of the analysis application computes performance indicators for the candidate sensor location sets by applying the candidate sensor location sets to the evaluation database. The performance indicators are used as fitness values to evolve the sensor location sets, and search for an optimized sensor location set. Once an optimized sensor location set is found that minimizes information entropy or maximizes total modal energy, a user interface (UI) module of the analysis application displays such optimized sensor location set to a user. Based on the display, actual sensors may be applied to the structure at the locations to configure a SHM system.

It should be understood that a variety of additional features and alternative embodiments may be implemented other than those discussed in this Summary. This Summary is intended simply as a brief introduction to the reader for the further description which follows, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which:

FIGS. 3E and 3F are screen shots of example results UIs;

DETAILED DESCRIPTION

Figure 1:
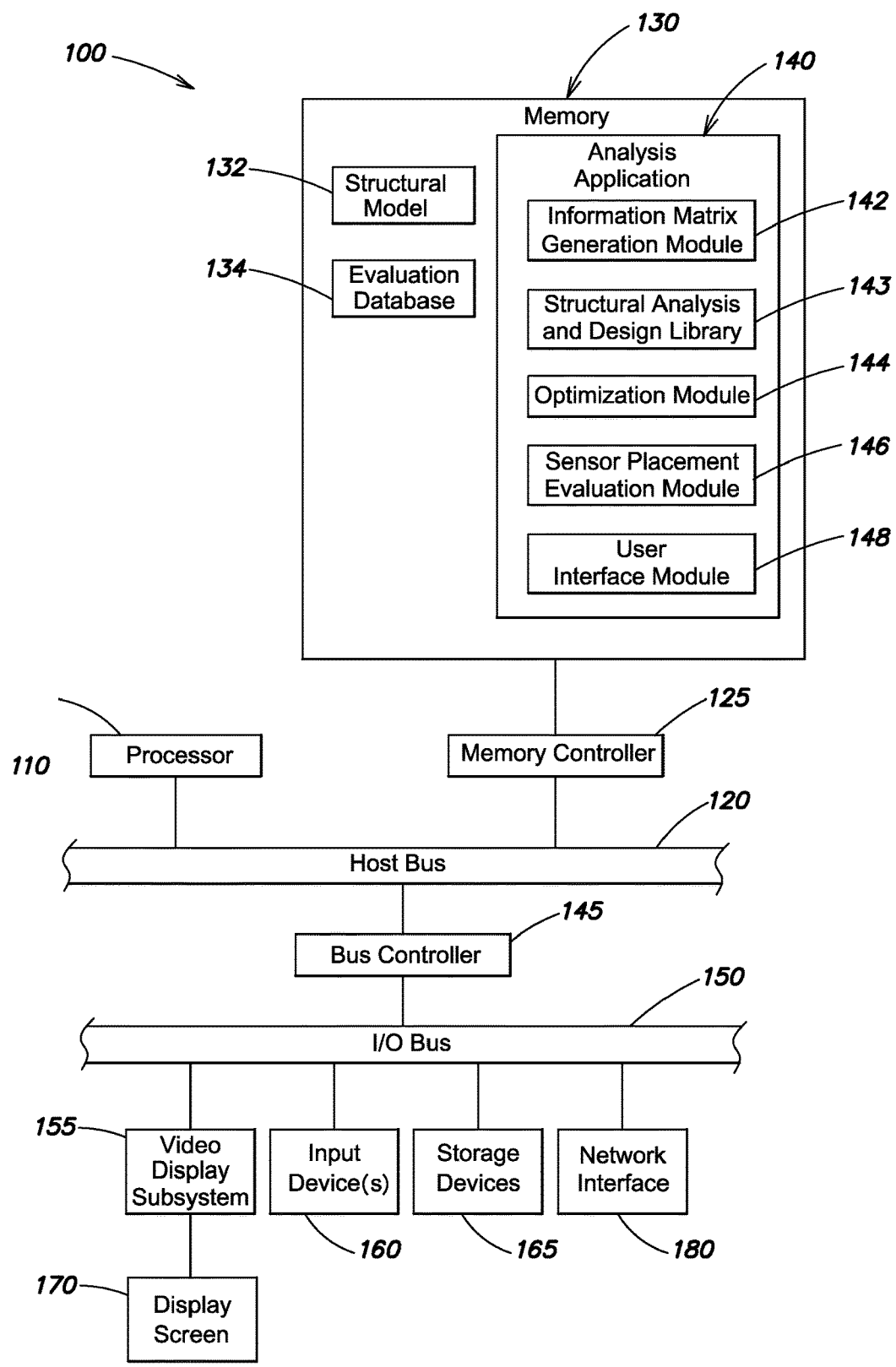
FIG. 1 is a block diagram of an example electronic device (e.g., a computer) that may be used with the present techniques.

FIG. 1 is a block diagram of an example electronic device 100 (e.g., a computer) that may be used with the present techniques. The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM) is also coupled to the host bus via a memory controller 125. When in operation, the memory 130 stores software (i.e. processor-executable instructions) and data that are provided to the processor 110. An input/output (I/O) bus 150 is coupled to the host bust 120 via a bus controller 145. A variety of additional components are coupled to the I/O bus 150. For example, a video display subsystem 155 is coupled to the I/O bus 150. The video display subsystem may include a display screen 170 and hardware to drive the display screen. At least one input device 160, such as a keyboard, a touch sensor, a touchpad, a mouse, etc., is also coupled to the I/O bus. A persistent storage device 165, such as a hard disk drive, a solid-state drive, or another type of persistent data store, is further attached, and persistently stores processor-executable instructions and data, that are loaded into the memory 130 when needed. Still further, a network interface 180 is coupled to the I/O bus 150. The network interface enables communication over a computer network, such as the Internet, between the electronic device 100 and other devices, using any of a number of well-known networking protocols. Such communication may enable collaborative, distributed, or remote computing with functionality (including the functionality discussed below) spread across multiple electronic devices.

Working together, the components of the electronic device 100 (and other electronic devices in the case of collaborative, distributed, or remote computing) may execute a number of different software applications. For example, the memory 130 may store at least a portion of software for an analysis application 140 used to determine, for a user-provided number of sensors, optimized locations on a structure that minimize information entropy or maximize total modal energy. The analysis application 140 utilizes data stored in the memory 130 such as a structural model 132 of the structure and an evaluation database 134, in conjunction with software modules or other sub-parts of the analysis application 140, such as an information matrix generation module 142, a structural analysis and design library 143, an optimization module 144, a sensor placement evaluation module 146, and a UI module 148, etc.

The structural model 132 may be a parameterized structural model, such as finite element (FE) model or a modal model, which describes the input-output behavior of the structure. The evaluation database 134 stores an information matrix, (e.g., a Fisher information matrix (FIM)) defined according to an entropy-based approach or an energy-based approach. The information matrix generation module 142 calculates an information matrix using the structural model 132 that is stored in the evaluation database 134. The structural analysis and design library 143 includes functions for performing simulation runs for the scenarios, to produce results. The optimization module 144 may employ a genetic algorithm to determine candidate sensor location sets, and evolve those candidate sensor location sets based on fitness values, until an optimized sensor location set is determined. In one implementation, the optimization module 144 is implemented as a generic optimization framework, such as the Darwin Optimization Framework available from Bentley Systems Inc. of Exton Pa. The sensor placement evaluation module 146 computes performance indicators for sensor location sets using information from the evaluation database 132. For example, according to an entropy-based approach the sensor placement evaluation module 146 may generate performance indicators that measure information entropy. Likewise, according to an energy-based approach the sensor placement evaluation module 146 may generate performance indicators that measure total modal energy. The sensor placement evaluation module 146 provides the performance indicators back to the optimization module 144 for use as fitness values. The sensor placement evaluation module 146 may be an independent software module, or may be implemented as a portion of the optimization module 144. The UI module 148 displays graphical UIs on the display screen 170, in which a user may select parameters and view optimized sensor location results, among other tasks.

The analysis application 140 and its modules 142-148 operate to solve a mathematically defined sensor placement optimization problem. The sensor placement optimization problem may be formulated to minimizes information entropy or maximizes total modal energy. A spatial error covariance model may be applied in either approach to avoid redundant information provided by neighboring sensors.

First, looking to an entropy-based approach, Let $\theta \in \mathbb{R}^{N_\theta}$ be the vector of free parameters (physical or modal parameters) that need to be estimated using measured data D collected from a collection of sensors (e.g., accelerometers, strain gauges, corrosion sensors, etc.). Let D={$y_k$, k=1, . . . , N} be measured sampled response time histories data, where $y_k \in \mathbb{R}^{N_0}$ refers to output data and $N_0$ is a number observed degrees of freedom (DOFs). N is total number of sampled data. Let $x_k \in \mathbb{R}^{N_d}$, k=1, . . . , N be sampled response time histories computed at all $N_d$ model DOFs from the structural model 132 that corresponds to a specific value θ of the model parameters. The measured response satisfies the equation:

$$y_k = Lx_k(\theta) + Le_k(\theta) \qquad (1)$$

where ek (θ) is the prediction error due to modeling error and measurement noise. The matrix $L \in \mathbb{R}^{N_0 \times N_d}$ is an observation matrix comprised of zeros and ones and maps model DOFs to measured DOFs. The matrix L therefore defines the location of the sensors in the structure. The information entropy measures uncertainty in the model parameter estimates. Asymptotically for very large number of data ($NN_0 \rightarrow \infty$), the information entropy depends on the determinant of the Fisher information matrix (FIM). As such, the determinant (as opposed to the trace or other scalar measures of FIM) may be used, providing:

$$h(L; \Sigma, D) \sim H(L; \theta_0, \Sigma) = \frac{1}{2}N_\theta \ln(2\pi) - \frac{1}{2}N_\theta \ln(\det Q(L; \theta_0, \Sigma)) \quad (2)$$

where $\theta_0 = \hat{\theta}(L; \Sigma, D)$ is the optimal value of the parameter set $\theta$ that minimizes the measure of fit $J(\theta, \Sigma, D)$, which is given as:

$$J(\theta, \Sigma, D), = \frac{1}{NN_0}\sum_{k=1}^{N}\{y_k - Lx_k(\theta)\}^T \Sigma^{-1}\{y_k - Lx_k(\theta)\} \quad (3)$$

$Q(L; \theta_0, \Sigma)$ in equation (2), the FIM, is a $N_\theta \times N_\theta$ semi-positive definite matrix asymptotically approximated by:

$$Q(L, \theta_0, \Sigma), = \sum_{k=1}^{N}\{L\nabla_\theta x_k\}^T\{L\Sigma L^T\}^{-1}\{L\nabla_\theta x_k\} \quad (4)$$

in which $\nabla_\theta$ is the gradient vector with respect to the parameter set $\theta$. $\Sigma$ is the error covariance matrix of $e_k(\theta)$ composed of measurement errors and model errors such that:

$$\Sigma = \Sigma^m + \Sigma^s \quad (5)$$

where $\Sigma^m$ and $\Sigma^s$ are the covariance matrices of the measurement and model errors, respectively. It may be assumed that the measurement error is independent of the location of sensors, so that the covariance matrix $\Sigma^m = s^2 I$, where I is the identity matrix. However, a certain degree of correlation should be expected for the model errors between two neighborhood locations arising from the underlining model dynamics. This correlation can be taken into account by selecting a non-diagonal covariance matrix $\Sigma^s$. The correlation $\Sigma_{i,j}^s$ between DOFs i and j can be expressed as:

$$\sum_{i,j}^{s} = \sqrt{\sum_{i,i}^{s}\sum_{i,j}^{s} R(d_{i,j})} \quad (6)$$

where $d_{i,j}$ is the spatial distance between DOFs i and j. The correlation function $R(d_{i,j})$ can be written in a general form $$R(d_{i,j}) = \exp\left(-\frac{d_{i,j}}{\lambda}\right) \quad (7)$$

where $\lambda$ is a measure of the correlation lengths. The spatial correlation of the prediction error tends to shift the sensors away from each other.

Sensor locations are desired that provides the most information in order to estimate the modal coordinate vector $\theta = \xi \in \mathbb{R}^m$. Thus, $N_\theta = m$. Applying modal analysis, the response vector $x \in \mathbb{R}^{N_d}$ is given with respect to the parameter set $\theta$ in the form $x = \Phi\theta$, where $\Phi \in \mathbb{R}^{N_d \times m}$ is the mode shape matrix for m contributing modes. Noting that $\nabla_\theta x = \Phi$ and substituting into Eq. (4), the information matrix takes the form:

$$Q(L, \theta_0, \Sigma) = Q(L, \Sigma) = \{L\Phi\}^T\{L\Sigma L^T\}^{-1}\{L\Phi\} \quad (8)$$

which is independent of the nominal parameter values $\theta_0$. Based on the form of equation (8), a non-singular fisher information matrix $Q(L,\Sigma)$ is obtained only if the number of sensors, $N_0$, is at least equal to the number of contributing modes, m. Otherwise, for $N_0 < m$, the matrix $Q(L,\Sigma)$ in equation (8) is singular and the determinant of the FIM will be zero for any sensor configuration. One way to optimally place sensors in the structure for $N_0 < m$ is to maximize the product of the $N_0$ non-zero eigenvalues in the FIM, instead of maximizing the product of all eigenvalues.

Second, looking to an modal energy-based approach, the modal energy for the i-the mode $E_i$ captured by certain sensor placement L can be defined as following:

$$E_i(L,\Sigma) = \{L\varphi\}^T\{L\Sigma L^T\}^{-1}\{L\varphi_i\} \quad (9)$$

where $\varphi_i$ is the i-th mode shape and $\Sigma$ is the error covariance matrix defined in equation (5). The modal energy defined above is equivalent to the i-th diagonal entry of FIM in equation (9). Therefore the total modal energy E captured by certain sensor placement L can be expressed as:

$$E(L, \Sigma) = \sum_{i=1}^{m} E_i(L, \Sigma) = \text{trace}\{Q(L, \Sigma)\} \quad (10)$$

Following the definition of captured modal energy, the total modal energy of the system can be expressed as:

$$E_a(\Sigma) = \sum_{i=1}^{m} \varphi_i^T \Sigma^{-1} \varphi_i \quad (11)$$

The captured energy ratio can be defined as:

$$r(L, \Sigma) = \frac{E(L, \Sigma)}{E_a(\Sigma)} \quad (12)$$

Using either the entropy-based approach or the modal energy-based approach, it is desirable to search for a specified number of sensor locations, noted as K, so that the overall performance of the K sensors is maximized. Therefore, the sensor placement optimization may be formulated as:

Search for: $S_K = (S_1, S_2, S_3, \ldots, S_K) \in S$
Entropy-based approach minimize: $H(L, \theta_0, \Sigma)$
or
Modal energy-based approach Maximize: $E(L, \Sigma)$ The analysis application 140 may solve this problem in two phases including: (1) generation of the information matrix and (2) optimization of sensor placement with a genetic algorithm.

Figure 2:
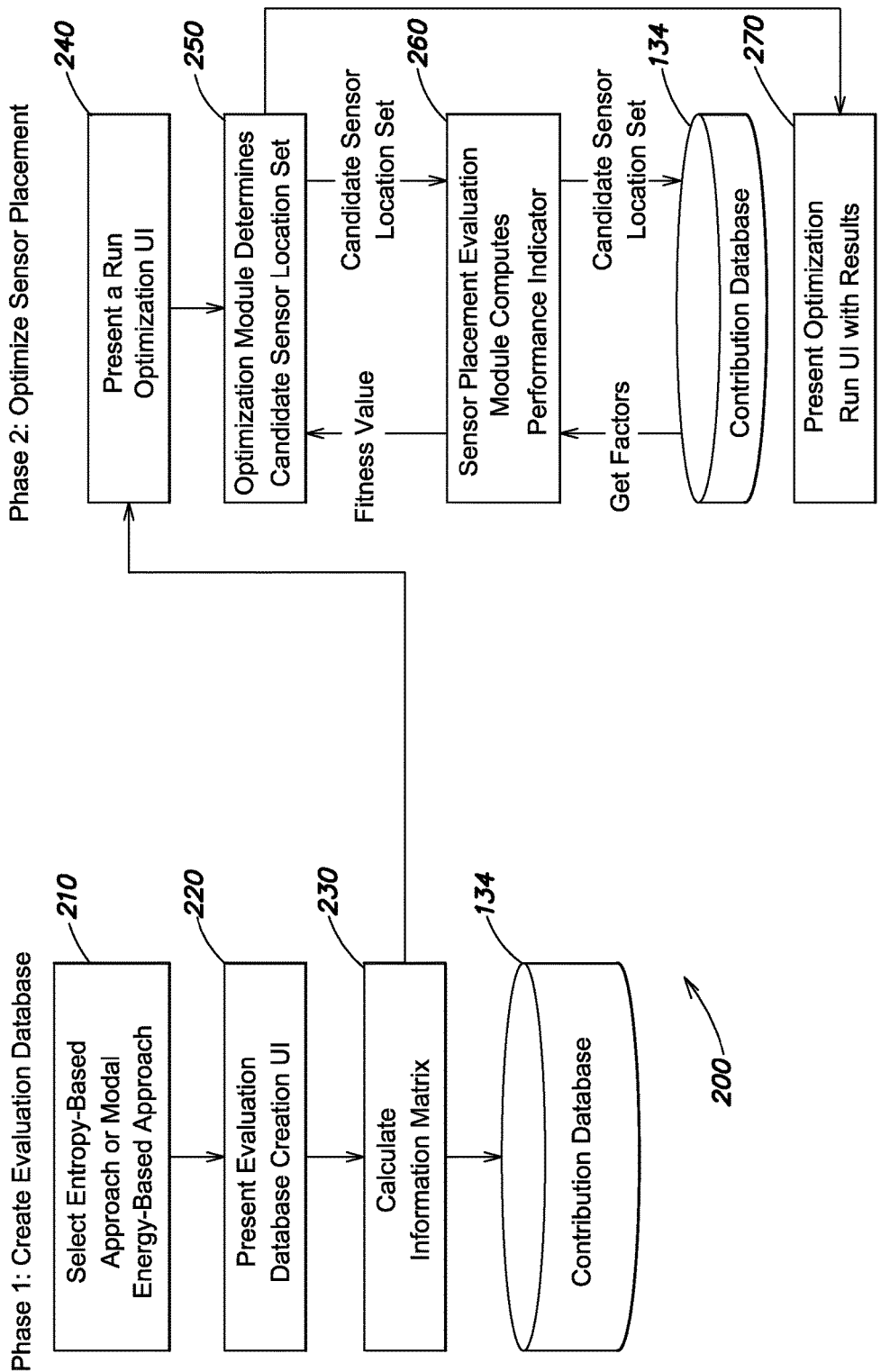
FIG. 2 is a flow diagram of an example sequence of steps that may be implemented by the analysis application for optimizing sensor placement.
Figure 3A:
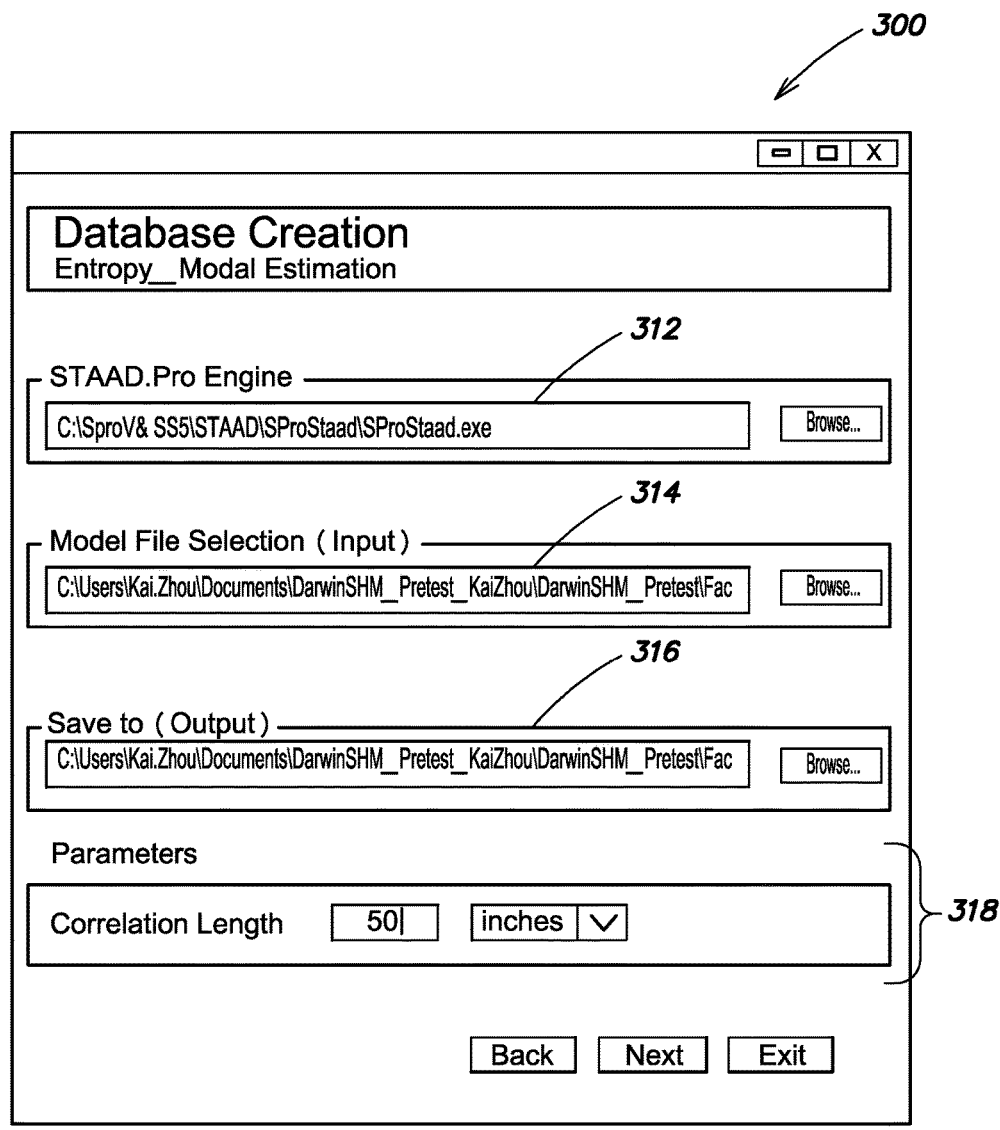
FIG. 3A is a screen shot of an example evaluation database creation UI.
Figure 3B:
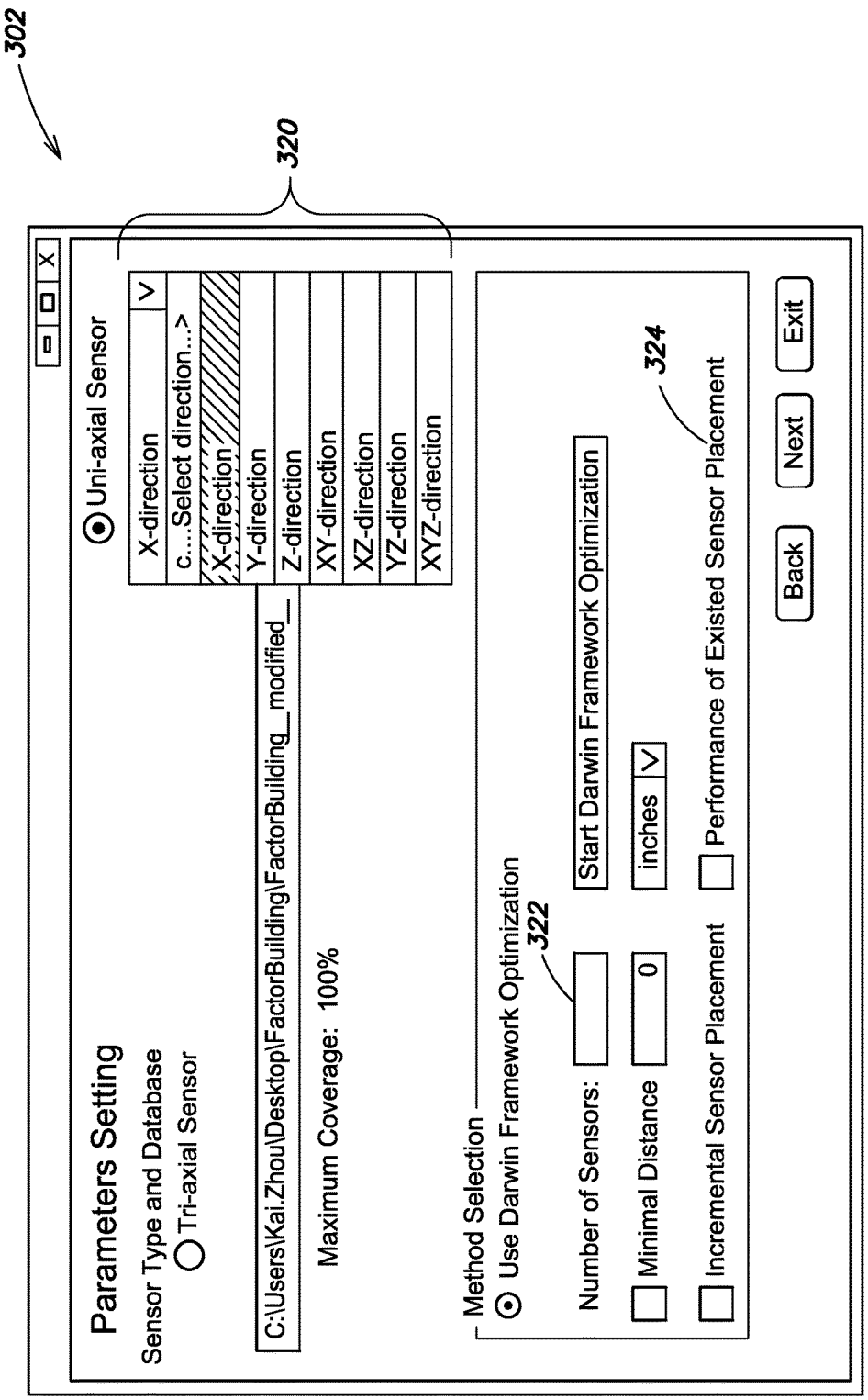
FIGS. 3B and 3C are screenshots of an example parameter setting UIs.
Figure 3C:
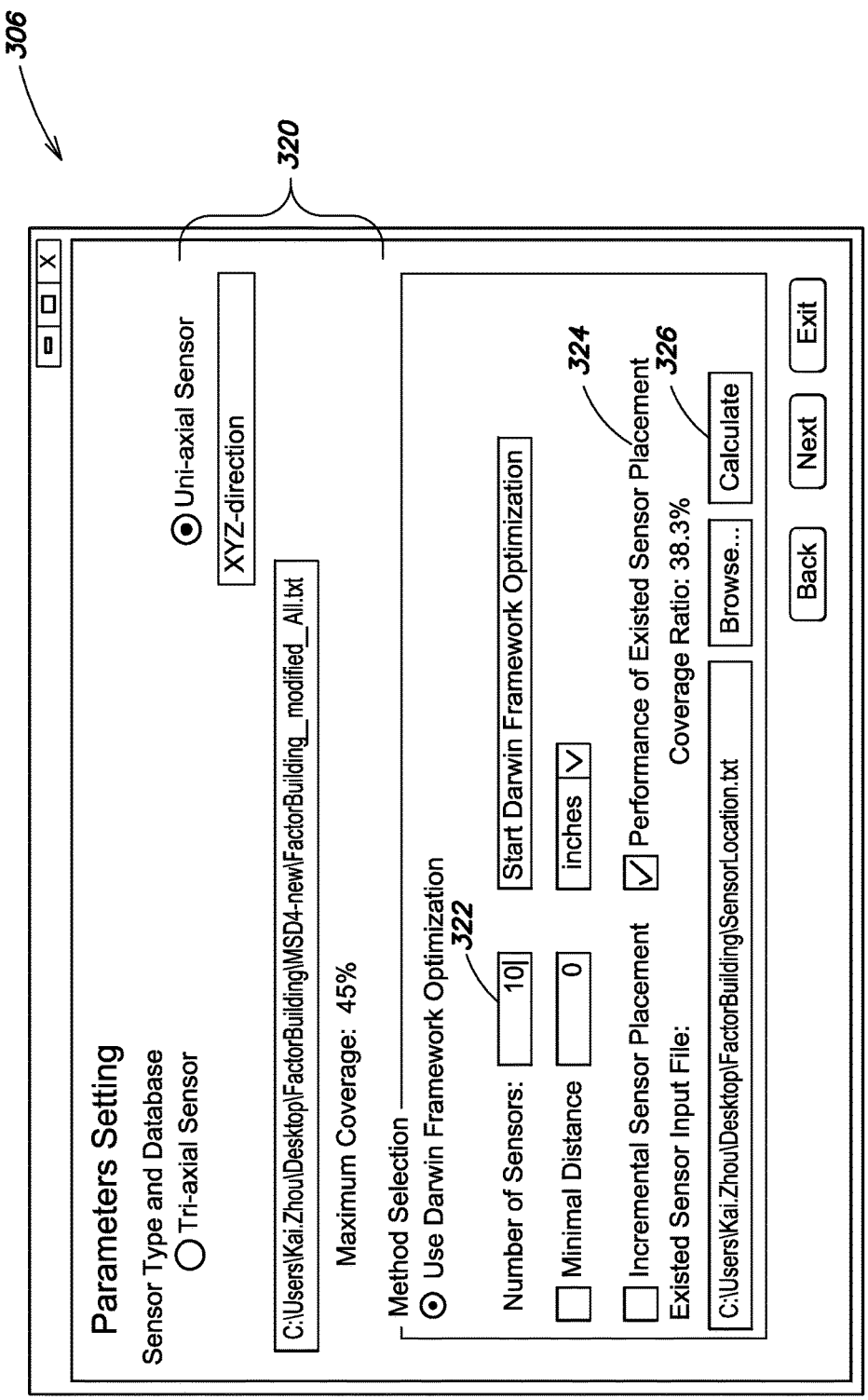

FIG. 2 is a flow diagram of an example sequence of steps 200 that may be implemented by the analysis application 140 for optimizing sensor placement. At step 210, a user select whether an entropy-based approach or a modal energy-based approach is to be performed. The selection may be made in a UI, or by activating a particular version of the analysis application 140. At step 220, the UI module 148 presents an evaluation database creation UI and then a parameter setting UI on the display screen 170. FIG. 3A is a screen shot of an example evaluation database creation UI 300. FIGS. 3B and 3C are screenshots of an example parameter setting UIs 302 and 306. The evaluation database creation UI 300 may include a field 312 for selecting a structural analysis and design library 143, a field 314 for selecting a structural model, a field 316 for selecting an output destination, as well as fields 318 for setting at least some parameters. The parameter setting UI 302 and 306 may include additional fields 320 for selecting sensor types and properties, a field 324 for selecting a number of sensors to be applied to the structure, as well as other fields for setting a variety of other parameters. One such other parameter may be whether existing sensors applied to the structure should be considered as part of an optimized solution. For example, fields 322-324 may be provided to select whether existing sensors should be considered, and to receive a source of data describing locations of existing sensors.

At step 230, using the selected structural model and parameters, the information matrix generation module 142 calculates an information matrix using the above discussed formulas, and stores the information matrix in the evaluation database 134.

Figure 3D:
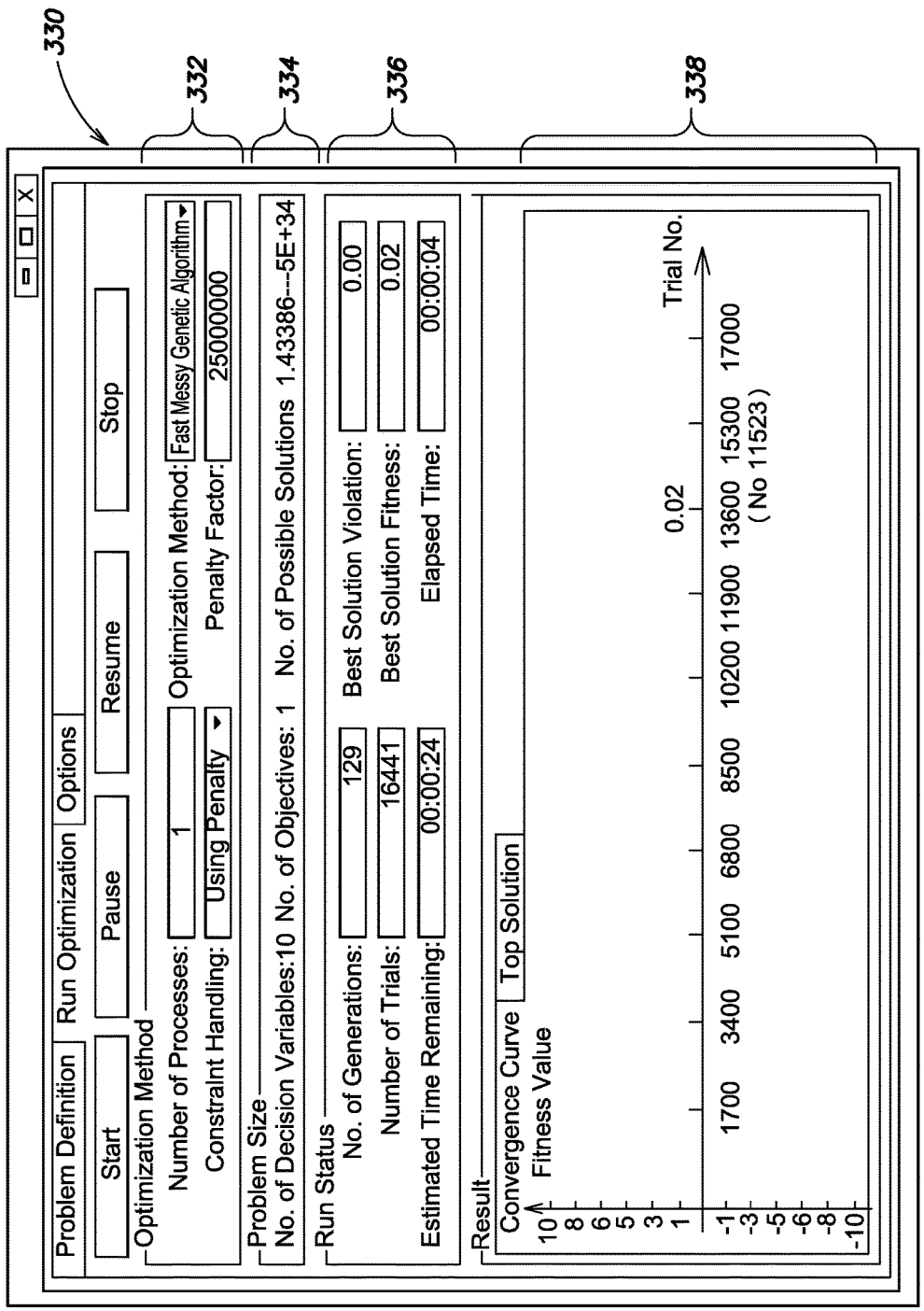
FIG. 3D is a screen shot of an example optimization run UI.

Thereafter, at step 240, the UI module 148 present an run optimization UI. FIG. 3D is a screen shot of an example run optimization UI 330. It may include a fields 332 for selecting optimization methods, fields 334 indicating problem size, fields 336 for selecting run status parameters, and fields 338 for displaying preliminary results, among other fields. A run may be conducted that includes a number of generations. At step 250, the optimization module 144 determines a candidate sensor location set indicating possible locations for each of the number of sensors. The optimization module 144 passes the sensor location set to the sensor placement module evaluation module 146. At step 260, the sensor placement module evaluation module 146 computes a performance indicator for the sensor location set, using the equations provided above and the evaluation database 134 (specifically to the information matrix represented therein). The performance indicator produced by the sensor placement module evaluation module 146 is provided back to the optimization module 144 as a fitness value. With a goal of minimizing information entropy or maximizes total modal energy, according the approach utilized, the optimization module 144 may produce (according to a genetic algorithm) a subsequent, potentially-improved candidate sensor location set (a next generation), and the steps 250-260 repeated until an optimized sensor location set is eventually produced. The optimized sensor location set may be provided to the UI module 148, which, at step 270, may display an optimization run UI. FIGS. 3E and 3F are screen shots of example results UIs 340, 342. Among other information, it may display results 352 including percent coverage of individual sensor location sets (including the optimized sensor location set) and locations of the sensors 354 for individual sensor location sets (including the optimized sensor location set). Utilizing the results, an engineer may apply actual sensors at the locations on the structure to configure a SHM system.

In general, the analysis application 140 may be used with a wide variety of different types of structures, and with different numbers of sensors, to produce optimized sensor location sets. As the number of sensors increases, the accuracy of modal identification results improves. Typical properties may be illustrated by example results of an example implementation.

Figure 4:
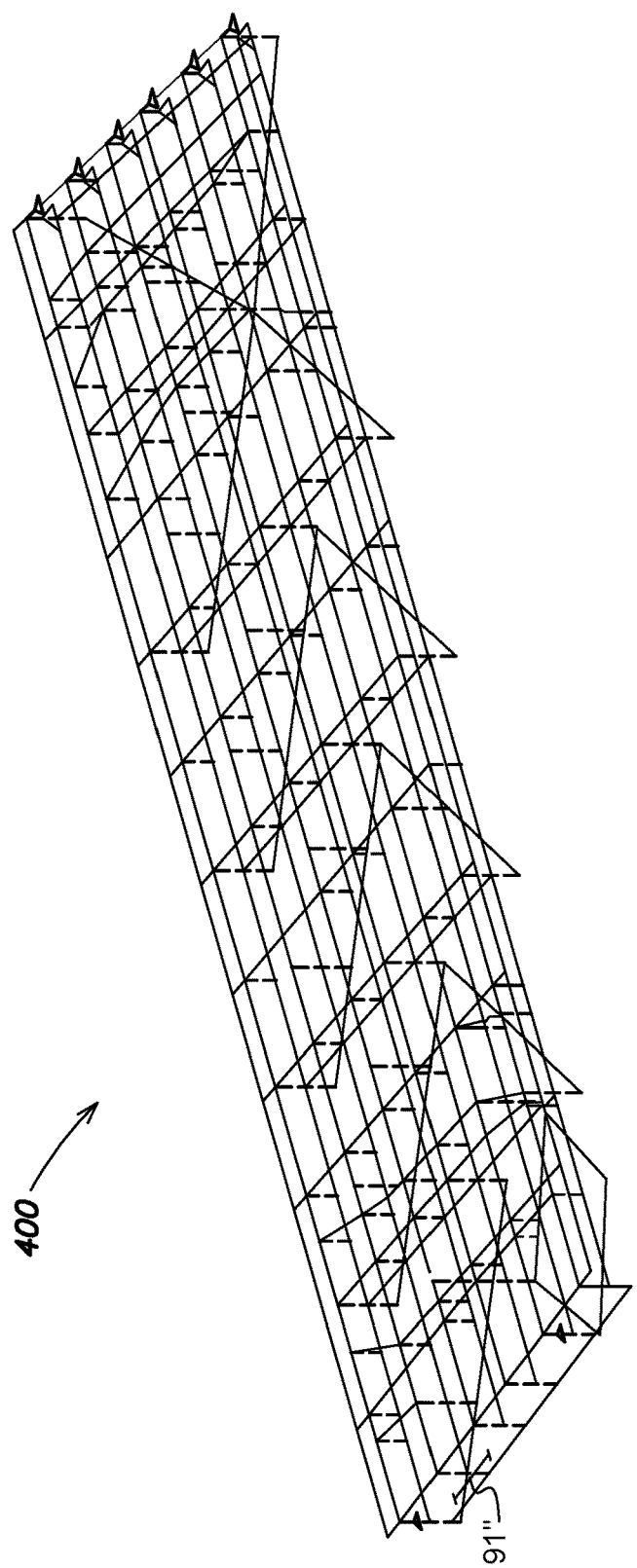
FIG. 4 is a representation of an example structural model, specifically a FE model, of an example structure.

FIG. 4 is a representation of an example structural model 400, specifically a FE model, of an example structure (here one approach span of the Verranzno Narrows Bridge Span in Brooklyn N.Y. City). The example structural model 400 was created using the STAAD.Pro v8i structural analysis and design application available from Bentley Systems Inc. of Exton Pa., and includes 177 beam elements and 107 plate elements, with 142 nodes. However, it should be understood that a variety of other structural analysis and design applications alternatively could have been utilized to create structure models with different numbers of element and nodes. For both an entropy-based approach and a modal energy-based approach, two representative spatial correlation lengths are considered: $\lambda=0$, which indicates uncorrelated measurements from sensors and $\lambda=2.3$ meters (91 inches), which coincides with a length between neighboring nodes in the width direction, as marked in FIG. 4

Figure 5A:
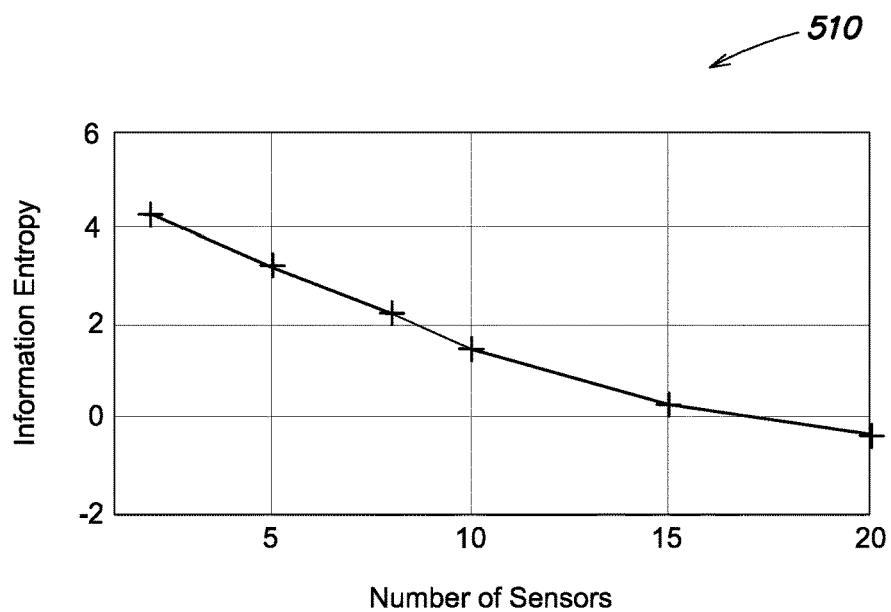
FIG. 5A is a plot of information entropy for different numbers of sensors with $\lambda=0$.

Considering first the entropy-based approach, FIG. 5A is a plot 510 of information entropy for different numbers of sensors (2, 5, 8, 10, 15 and 20) with $\lambda=0$. The optimal entropy value in FIG. 5A decreases monotonically as the number of sensors increases, which indicates that the uncertainty in measured modes decreases, and the accuracy of modal identification results improves.

FIGS. 5B-G are diagrams 520-570 showing example optimized sensor location sets for a entropy-based approach with different numbers of sensors (2, 5, 8, 10, 15, and 20) with $\lambda=0$. As can be seen, some sensors are placed very closely for the scenarios using 8, 15 and 20 sensors. This indicates that some redundant information is likely being captured by those sensors.

Figure 6A:
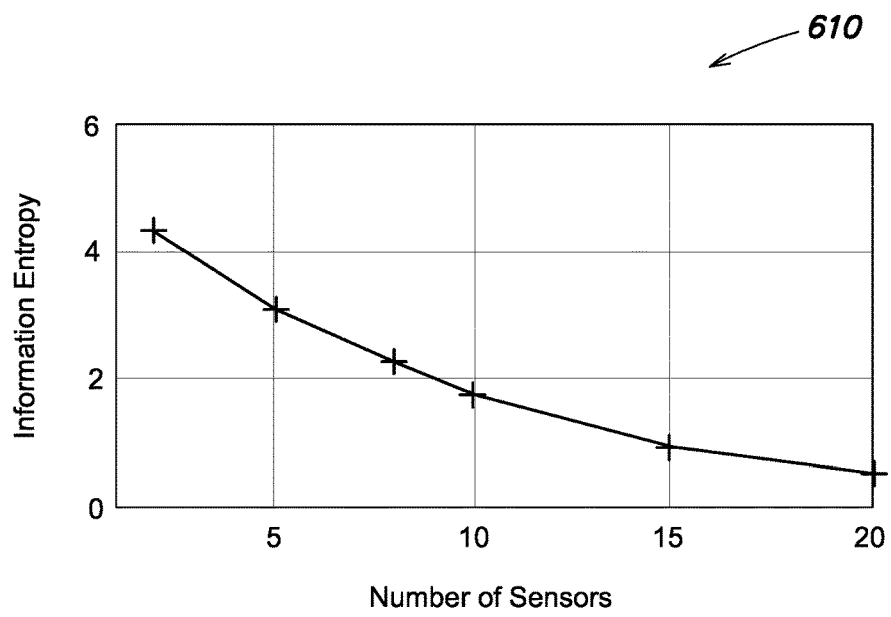
FIG. 6A is a plot of information entropy for different numbers of sensors with $\lambda=2.3$.
Figure 5C:
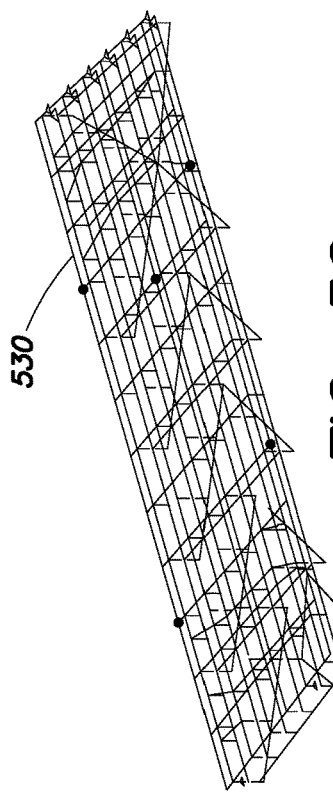
FIGS. 5B-G are diagrams showing example optimized sensor location sets for a entropy-based approach with different numbers of sensors with $\lambda=0$.
Figure 5B:
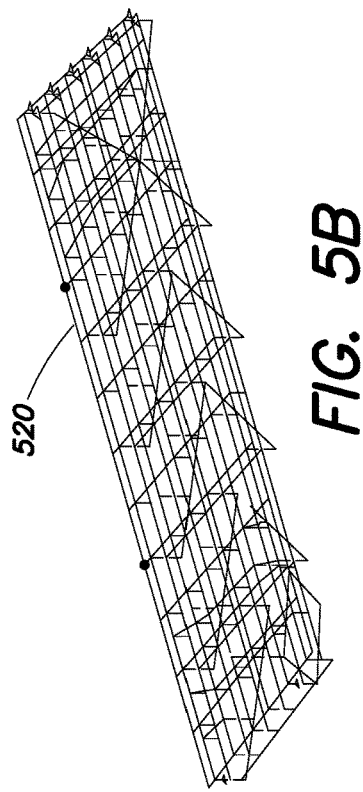
Figure 5D:
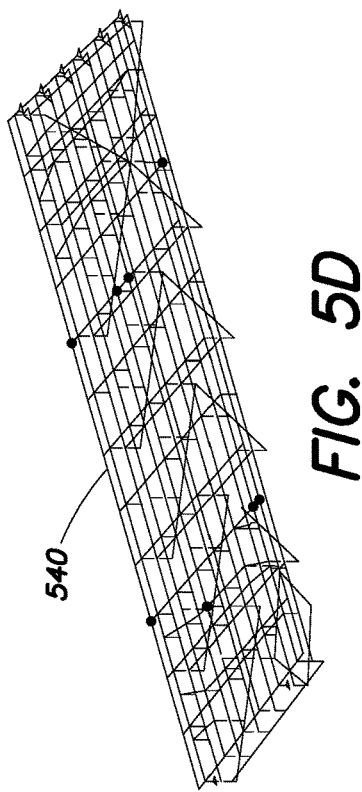
Figure 5E:
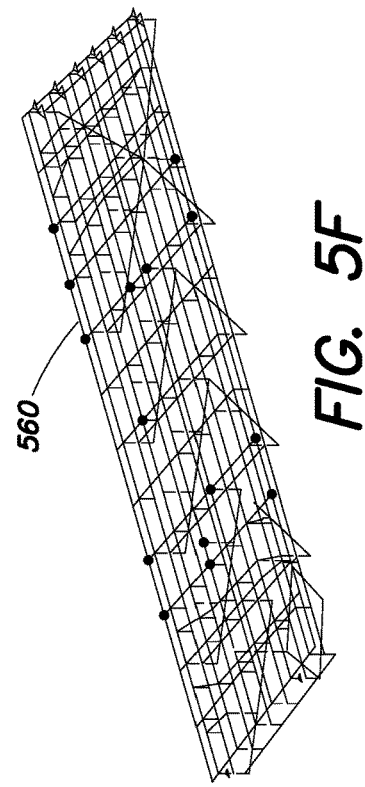
Figure 5F:
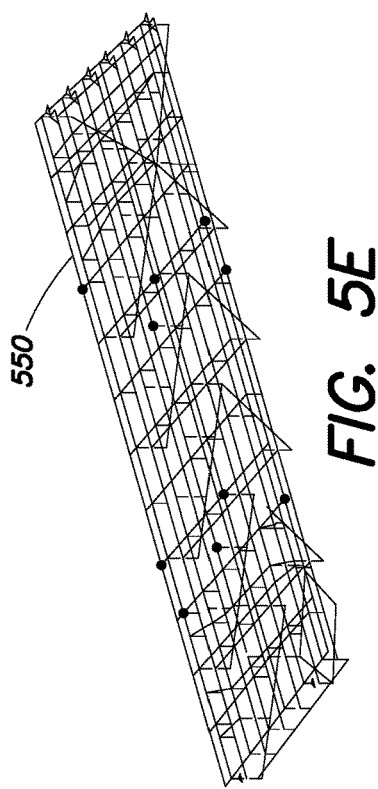
Figure 5G:
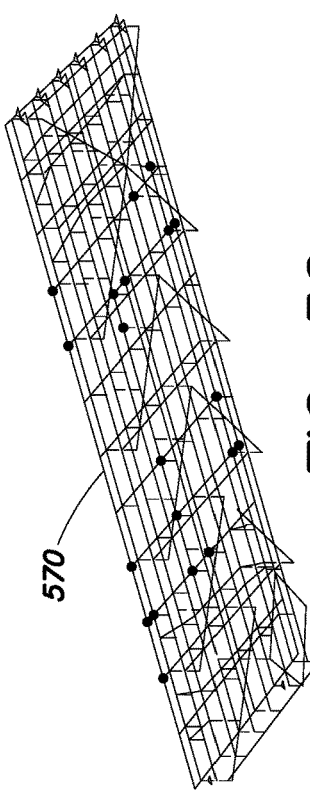
Figure 6C:
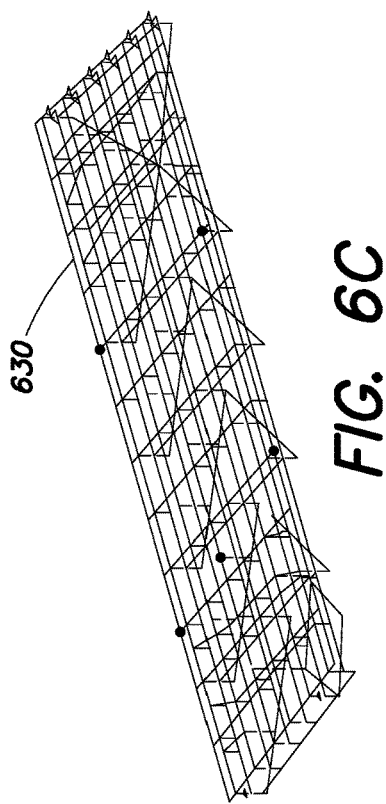
FIGS. 6B-G are diagrams showing example optimized sensor location sets for a entropy-based approach with different numbers of sensors with $\lambda=2.3$.
Figure 6B:
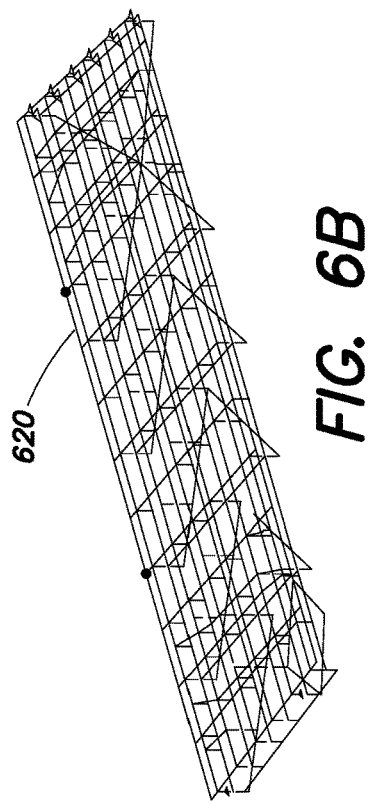
Figure 6D:
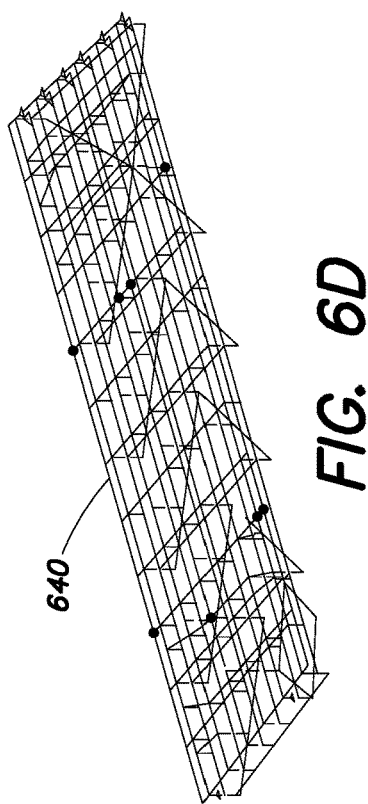
Figure 6F:
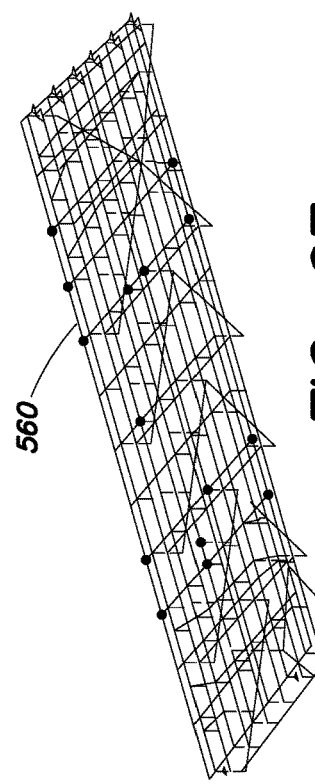
Figure 6E:
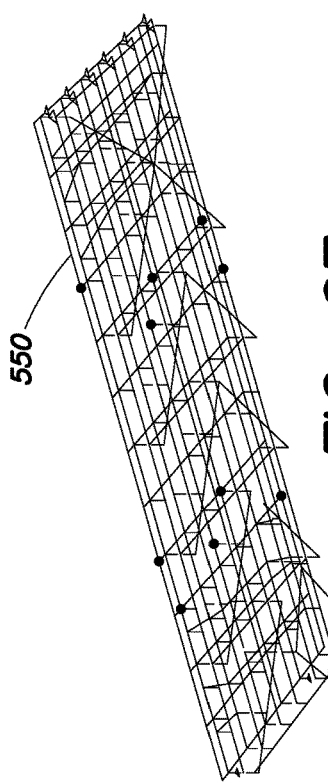
Figure 6G:
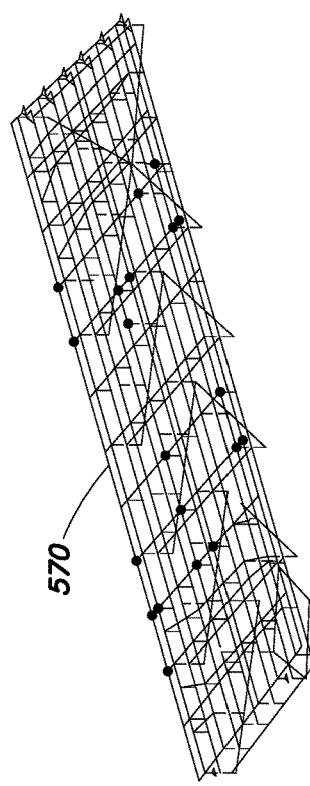

FIG. 6A is a plot 610 of information entropy for different numbers of sensors (2, 5, 8, 10, 15 and 20) with $\lambda=2.3$. The optimal entropy value in FIG. 6A decreases monotonically as the number of sensors increases, which indicates that the uncertainty in measured modes decreases, and the accuracy of modal identification results improves.

FIGS. 6B-G are diagrams 620-670 showing example optimized sensor location sets for a entropy-based approach with different numbers of sensors (2, 5, 8, 10, 15, and 20) with $\lambda=2.3$. Compared with the sets of FIGS. 5B-G, it can be seen that the sensors are better separated, which indicates that the captured model information is likely improved (i.e. there is less redundant information)

Figure 7A:
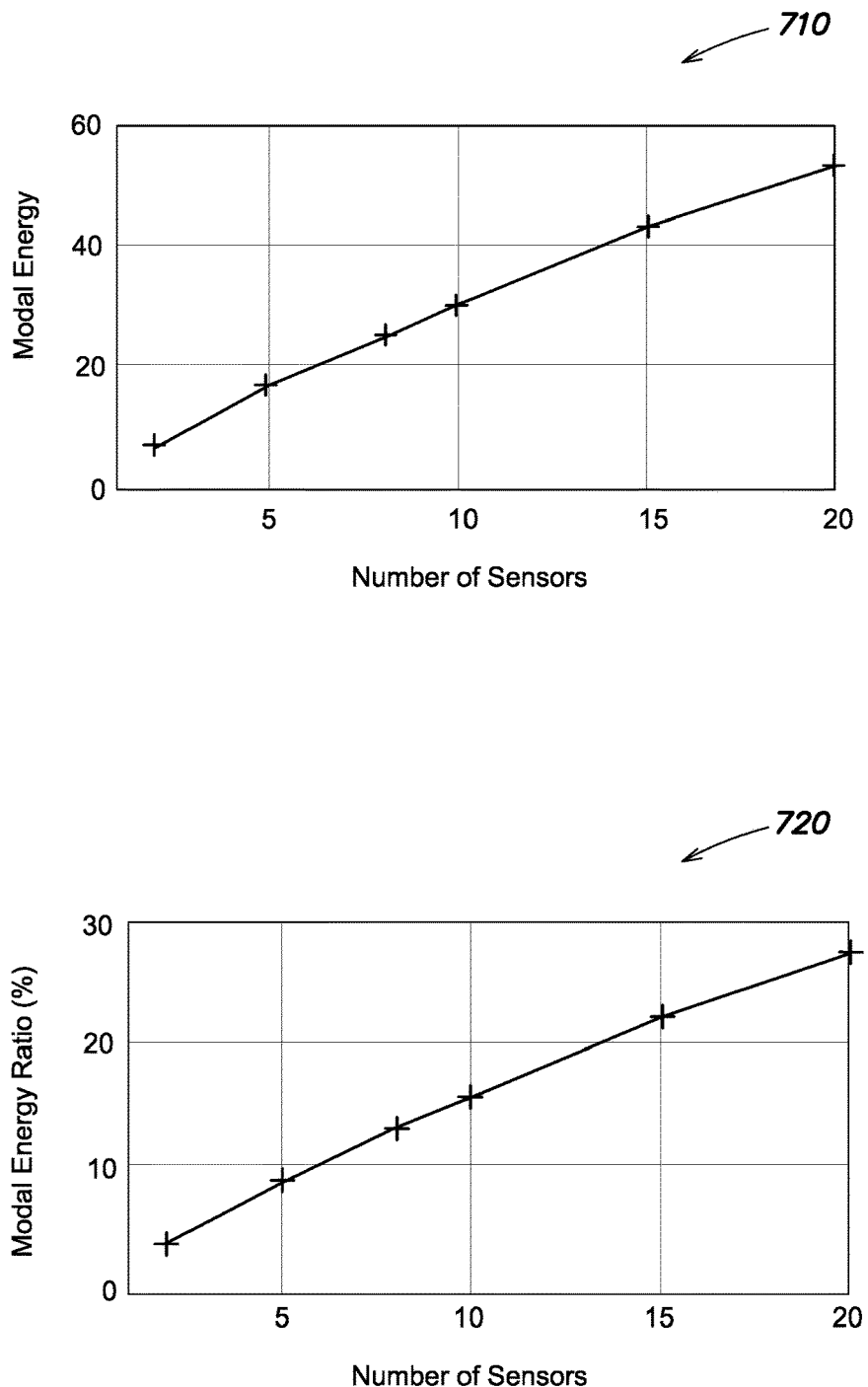
FIG. 7A is a plot of modal energy and a plot of energy ratio for different numbers of sensors with $\lambda=0$.
Figure 7B:
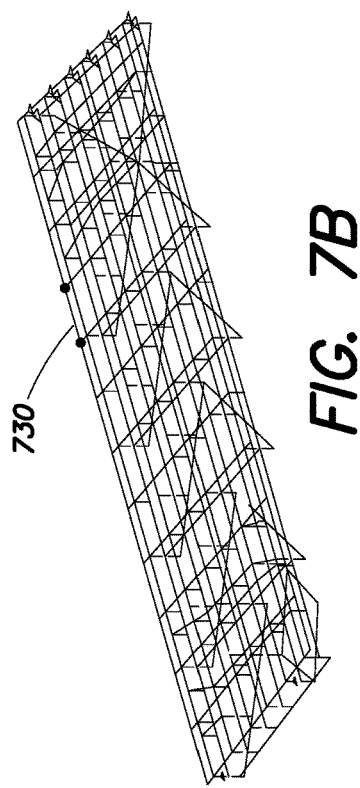
FIGS. 7B-G are diagrams showing example optimized sensor location sets for a modal energy-based approach with different numbers of sensors with $\lambda=0$.
Figure 7C:
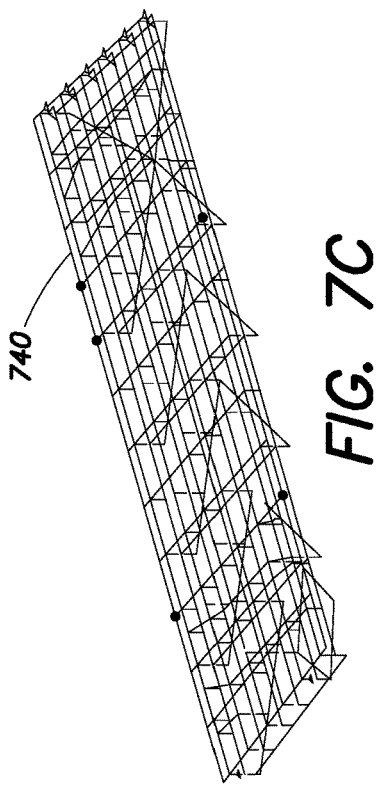
Figure 7D:
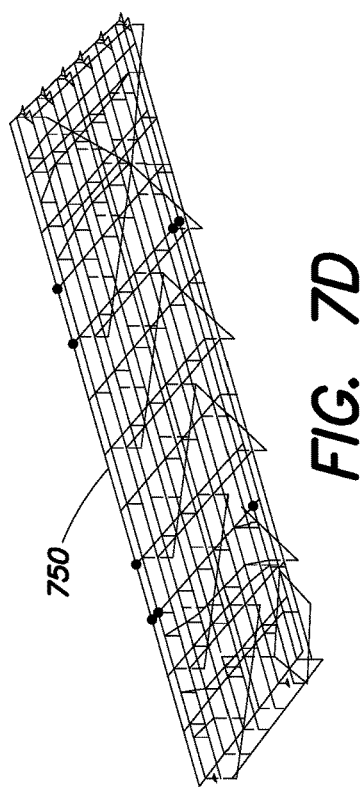
Figure 7F:
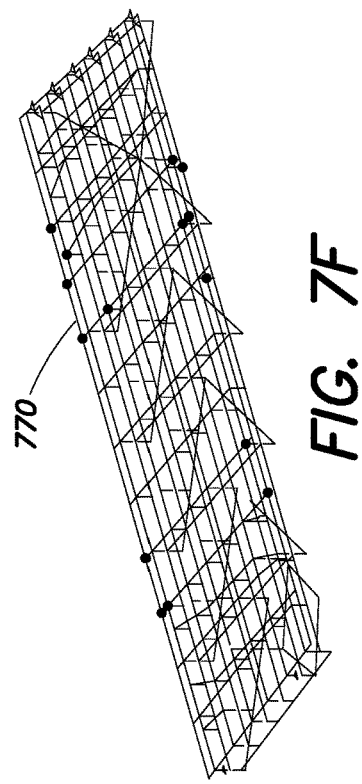
Figure 7E:
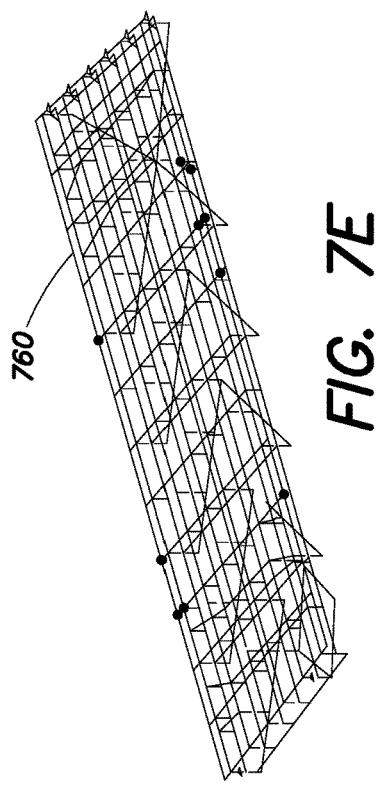
Figure 7G:
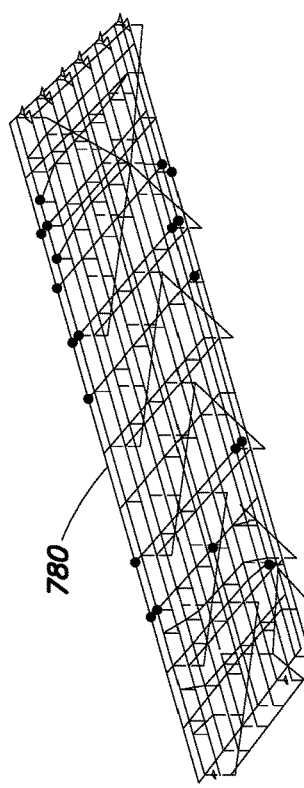

Considering next the modal energy-based approach, FIG. 7A is a plot 710 of modal energy and a plot 720 of energy ratio for different numbers of sensors (2, 5, 8, 10, 15 and 20) with $\lambda=0$. They both increase monotonically as the number of sensors increases, which indicates that the accuracy of modal identification results improves.

FIGS. 7B-G are diagrams 730-780 showing example optimized sensor location sets for a modal energy-based approach with different numbers of sensors (2, 5, 8, 10, 15, and 20) with $\lambda=0$. As can be seen, some sensors are placed very closely for the scenarios using 8, 10, 15 and 20 sensors, again indicating that some redundant information is likely being captured by those sensors.

Figure 8A:
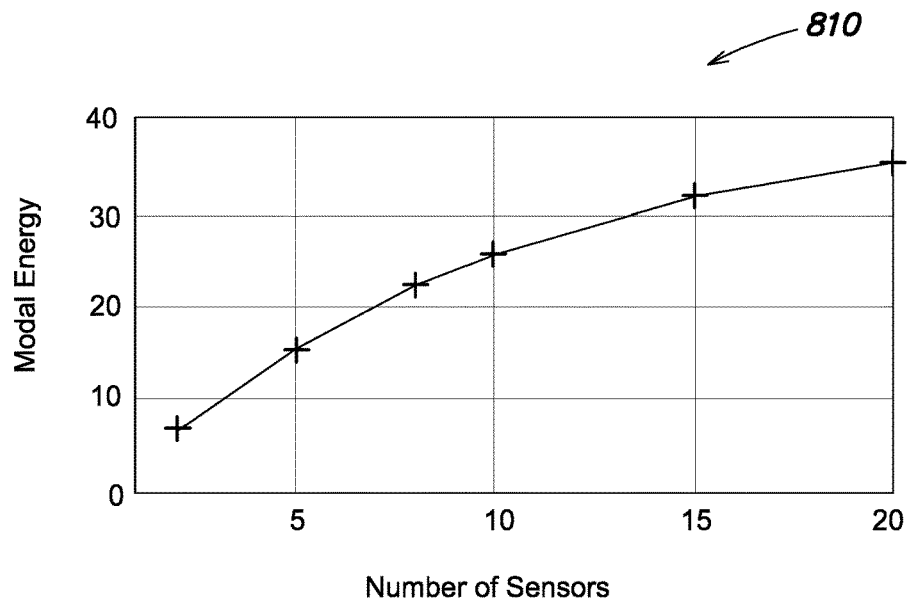
FIG. 8A is a plot of modal energy and a plot of energy ratio for different numbers of sensors with $\lambda=2.3$.
Figure 8A:
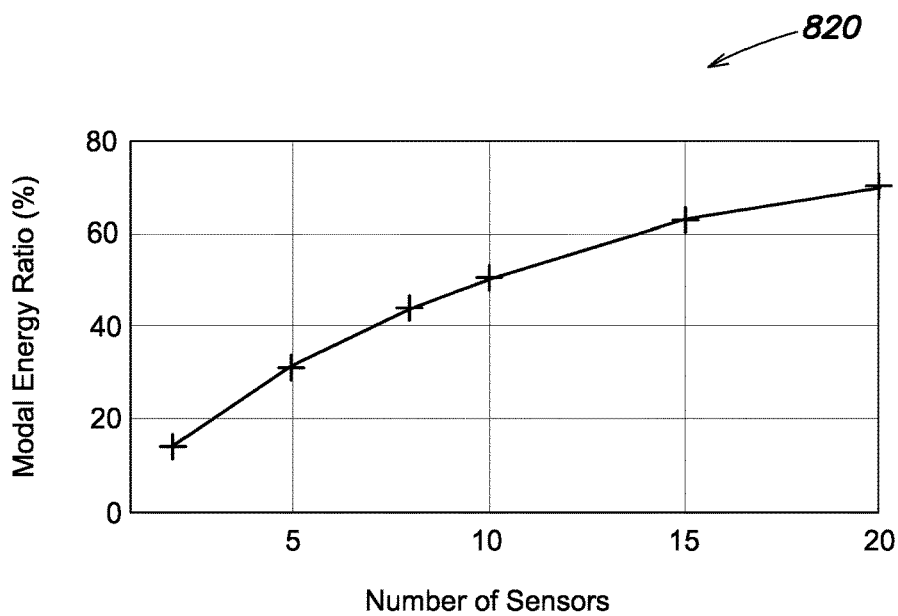
Figure 8C:
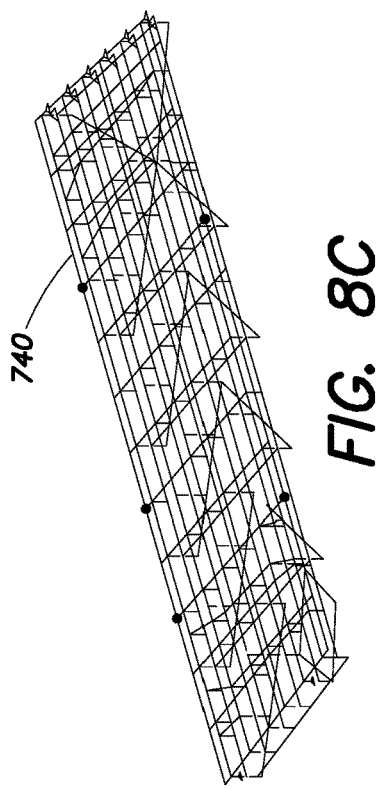
FIGS. 8B-G are diagrams showing example optimized sensor location sets with different numbers of sensors with $\lambda=2.3$.
Figure 8B:
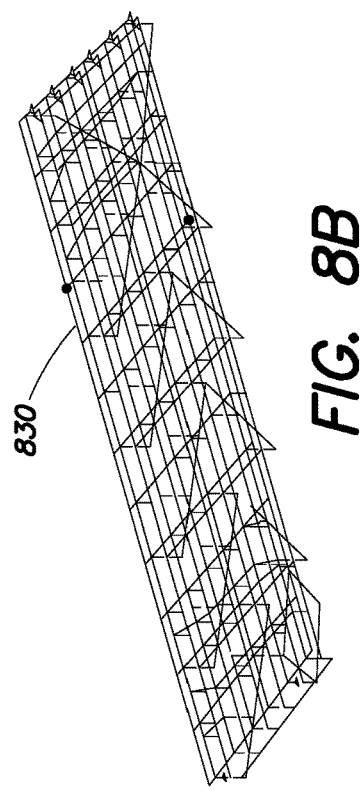
Figure 8D:
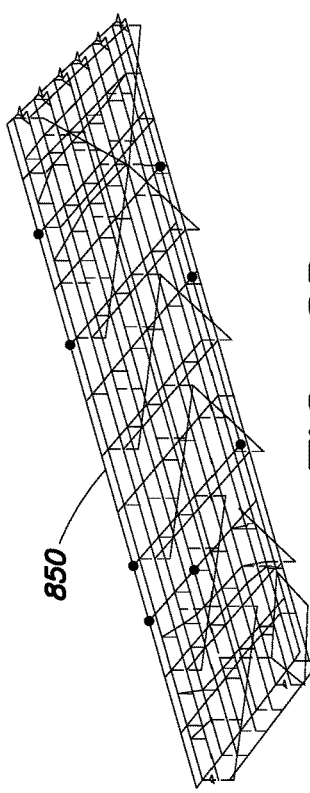
Figure 8E:
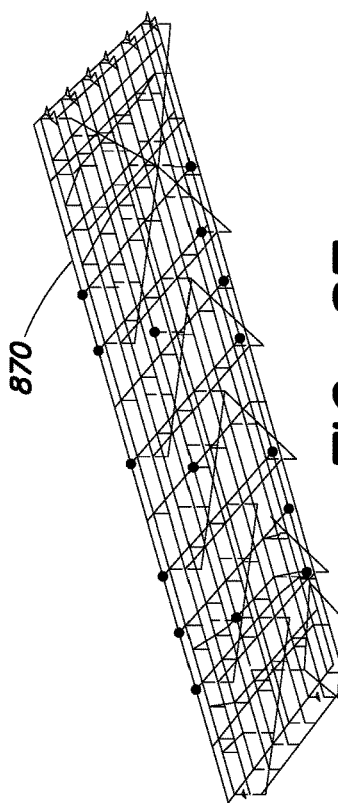
Figure 8F:
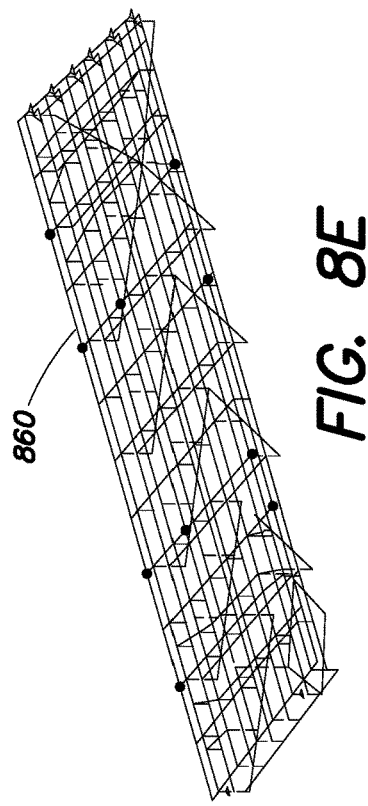
Figure 8G:
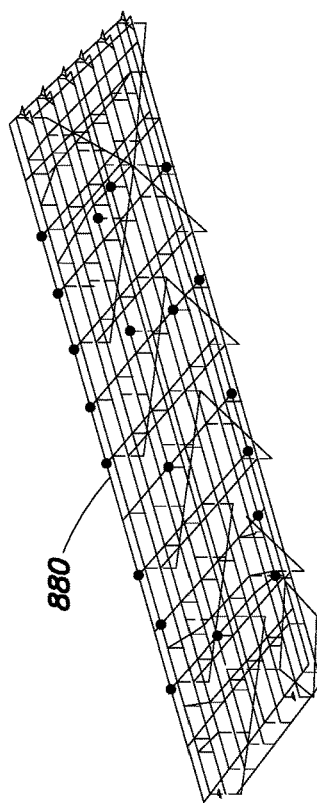

FIG. 8A is a plot 810 of modal energy and a plot 820 of energy ratio for different numbers of sensors (2, 5, 8, 10, 15 and 20) with $\lambda=2.3$. They both increase monotonically as the number of sensors increases, which again indicates that the accuracy of modal identification results improves.

FIGS. 8B-G are diagrams 830-880 showing example optimized sensor location sets with different numbers of sensors (2, 5, 8, 10, 15, and 20) with $\lambda=2.3$. Compared with the sets of FIGS. 7B-G, it can be seen that the sensors are better separated, which again indicates that the captured model information is likely improved (i.e. there is less redundant information)

In summary, the above description details techniques for optimizing sensor placement for structural health monitoring of a structure using an entropy-based approach or an energy-based approach. It should be understood that various adaptations and modifications may be readily made to the techniques, to suit various implementations. Further, it should be understood that at least some of the techniques may be implemented in software, in hardware, or a combination thereof. A software implementation may include computer-executable instructions stored in a non-transitory computer-readable medium, such as a volatile or persistent memory, a hard-disk, a compact disk (CD), or other storage medium. A hardware implementation may include specially configured processors, logic circuits, application specific integrated circuits, and/or other types of hardware components. Further, a combined software/hardware implementation may include both computer-executable instructions stored in a non-transitory computer-readable medium, as well as one or more specially configured hardware components, for example, processors. Accordingly, it should be understood that the above descriptions are meant to be taken only by way of example.

What is claimed is:

1. A method of optimizing sensor placement for structural health monitoring of a structure, comprising:
    generating, by an analysis application executing on an electronic device, an evaluation database that stores an information matrix usable to determine information entropy or mode shape for sensor placements;
    optimizing placement of a number of sensors, by the analysis application executing on the electronic device, to produce an optimized sensor location set that minimizes information entropy or maximizes total modal energy, by
        determining one or more candidate sensor location sets using a genetic algorithm implemented by the analysis application,
        computing performance indicators for the candidate sensor location sets by applying the candidate sensor location sets to the information matrix stored in the evaluation database, and
        using the performance indicators as fitness values to search for one or more subsequent sensor location sets, until the optimized sensor location set is produced that minimizes information entropy or maximizes total modal energy; and
    applying sensors at locations in the structure indicated by the optimized sensor location set that minimizes information entropy or maximizes total modal energy.

2. The method of claim 1, wherein the performance indicators are based on information entropy and the optimized sensor location set minimizes information entropy.

3. The method of claim 1, wherein the performance indicators are based on modal energy and the optimized sensor location set maximizes total modal energy.

4. The method of claim 1, wherein the information matrix is a Fisher information matrix (FIM).

5. The method of claim 4, wherein the FIM is based in part on an error covariance matrix that indicates measurement errors and model errors.

6. The method of claim 1, wherein the structure is represented by a parameterized structural model, and the generating the evaluation database is performed based on the parameterized structural model.

7. The method of claim 6, wherein the parameterized structural model is a finite element (FE) model having a plurality of elements connected at nodes and the possible sensor locations coincide with nodes of the FE model.

8. The method of claim 1, wherein the sensors comprise accelerometers.

9. The method of claim 1, further comprising:
    monitoring the structure by the sensors at the locations in the structure indicated by the optimized sensor location set that minimizes information entropy or maximizes total modal energy and alerting a user if sensor readings indicate possible structural damage.

10. A system comprising:
    an electronic device having:
        a display screen,
        one or more processors configured to execute executable instructions, and
        a memory configured to store an evaluation database that includes an information matrix usable to determine information entropy or mode shape for sensor placement, and executable instructions for a plurality of software modules of an analysis application that are executable on the one or more processors, the plurality of software modules including a user interface module configured to receive a user's selection of a number of sensors to be applied to the structure and display on the display device locations for sensors indicated by an optimized sensor location set, a sensor placement evaluation module configured to compute performance indicators of candidate sensor location sets by applying the candidate sensor location sets to the information matrix of the evaluation database, and an optimization module that utilizes a genetic algorithm to repeatedly determine the candidate sensor location sets and by employing the performance indicators as fitness values to eventually produce the optimized sensor location set that minimizes information entropy or maximizes total modal energy; and
    a plurality of sensor applied at locations on the structure indicated by the optimized sensor location set that minimizes information entropy or maximizes total modal energy and which operate to monitor structural health of the structure.

11. The system of claim 10, wherein the performance indicators are based on information entropy and the optimized sensor location set minimizes information entropy.

12. The system of claim 10, wherein the performance indicators are based on modal energy and the optimized sensor location set maximizes total modal energy.

13. The system of claim 10, wherein the information matrix is a Fisher information matrix (FIM).

14. The system of claim 13, wherein the FIM is based in part on an error covariance matrix that indicates measurement errors and model errors.

15. The system of claim 10, wherein the structure is represented by a parameterized structural model, and the evaluation database is based on the parameterized structural model.

16. The system of claim 15, wherein the parameterized structural model is a finite element (FE) model having a plurality of elements connected at nodes and the possible sensor locations coincide with nodes of the FE model.

17. The system of claim 10, wherein the sensors comprise accelerometers.

18. A method of optimizing sensor placement for structural health monitoring of a structure, comprising:
- selecting, in a user interface (UI) of an analysis application executing on the electronic device, a finite element (FE) model of the structure, the FE model having a plurality of elements connected at nodes, wherein possible sensor locations coincide with nodes of the FE model;
- generating, by the analysis application, based on the FE model of the structure, an evaluation database that stores an information matrix usable to determine information entropy or mode shape for sensor placements;
- optimizing, by an analysis application executing on an electronic device, placement of a number of sensors to produce an optimized sensor location set that minimizes information entropy or maximizes total modal energy, by
  - determining one or more candidate sensor location sets using a genetic algorithm of the analysis application,
  - computing performance indicators for the candidate sensor location sets by applying the candidate sensor location sets to the information matrix stored in the evaluation database, and
  - using of the performance indicators as fitness values to search for one or more subsequent sensor location sets, for a plurality of iterations and until the optimized sensor location set is produced that minimizes information entropy or maximizes total modal energy; and
- applying sensors at locations in the structure indicated by the optimized sensor location set that minimizes information entropy or maximizes total modal energy.

19. The method of claim 18, wherein the performance indicators are based on information entropy and the optimized sensor location set minimizes information entropy.

20. The method of claim 18, wherein the performance indicators are based on modal energy and the optimized sensor location set maximizes total modal energy.

21. The method of claim 18, wherein the information matrix is a Fisher information matrix (FIM), and the FIM is based in part on an error covariance matrix that indicates measurement errors and model errors.

22. The method of claim 18, further comprising:
- monitoring the structure by the sensors at the locations in the structure indicated by the optimized sensor location set that minimizes information entropy or maximizes total modal energy and alerting a user if sensor readings indicate possible structural damage.

* * * * *

UNITED STATES PATENT AND TRADEMARK OFFICE
CERTIFICATE OF CORRECTION

PATENT NO. : 10,451,416 B1
APPLICATION NO. : 15/187268
DATED : October 22, 2019
INVENTOR(S) : Zheng Yi Wu et al.

It is certified that error appears in the above-identified patent and that said Letters Patent is hereby corrected as shown below:

In the Specification
Column 5, Line 48:
Delete "$\Sigma_{i,j}{}^s$"
And Insert -- $\Sigma_{i,j}^s$ --

Signed and Sealed this
Thirty-first Day of March, 2020

Andrei Iancu
*Director of the United States Patent and Trademark Office*